Aug. 13, 1935.  R. W. KROUT  2,011,179
CONTAINER
Filed Feb. 20, 1931  2 Sheets-Sheet 1
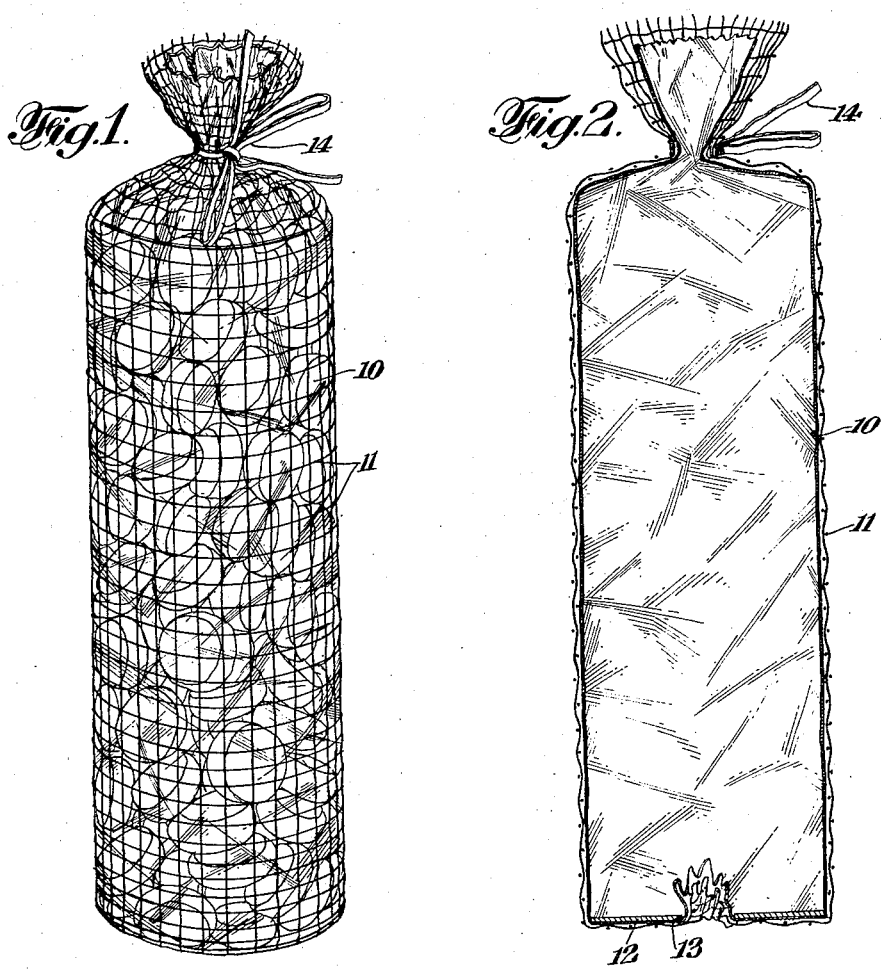
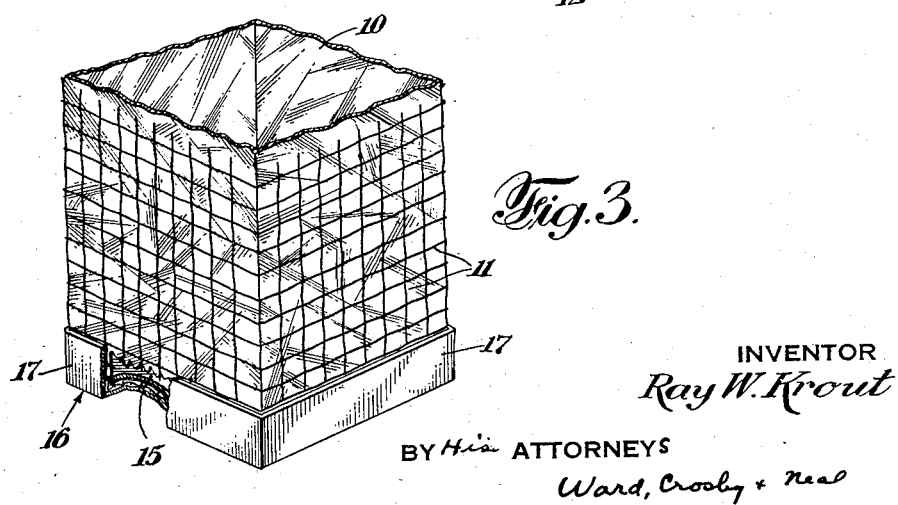
INVENTOR
Ray W. Krout
BY his ATTORNEYS
Ward, Crosby + Neal Aug. 13, 1935.    R. W. KROUT    2,011,179
CONTAINER
Filed Feb. 20, 1931    2 Sheets-Sheet 2
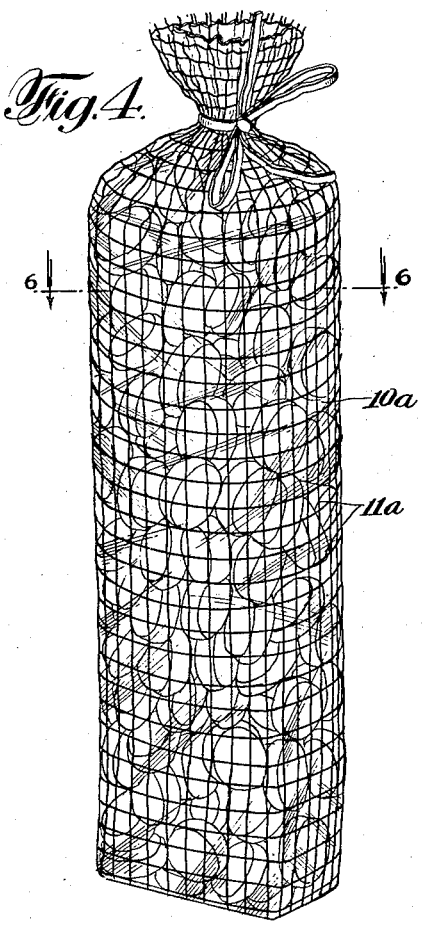
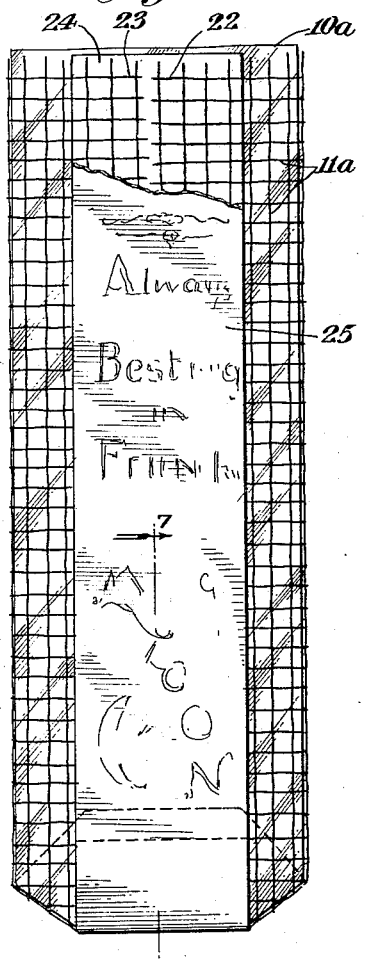
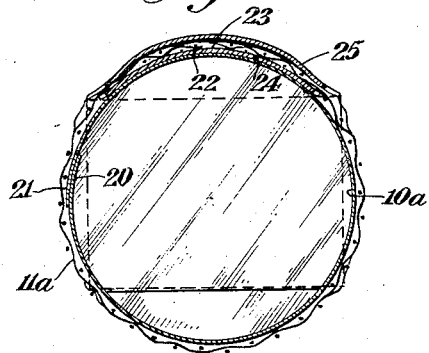
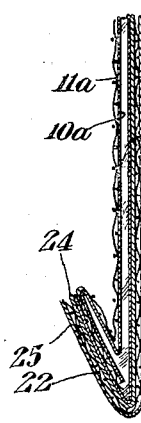
INVENTOR
Ray W. Krout
BY Ward, Crooly & Neal
His ATTORNEYS Patented Aug. 13, 1935

2,011,179

UNITED STATES PATENT OFFICE 2,011,179

CONTAINER

Ray W. Krout, Paterson, N. J., assignor to Charms Company, Newark, N. J., a corporation of Delaware Application February 20, 1931, Serial No. 517,196

1 Claim. (Cl. 229—53)

This invention relates to a container for candy or the like.

Among the objects of this invention are the provision of a container illustrated in the form of a bag, comprising an inner wall which may be made of relatively thin and weak flexible transparent waterproof material and an outer wall of relatively strong and stiff transparent woven or otherwise fabricated open mesh or perforated material; the provision of a base for supporting the bag in upright position and including means to which the walls of the bag may be readily secured; the provision of improved means for connecting the edges of the material forming the bag and for closing and forming the base of the bag; and the provision of a bag which is economical to manufacture, may be easily assembled, and is pleasing in appearance.

Other objects will be apparent from the following description taken in connection with the drawings, in which Fig. 1 shows a bag constructed according to the invention;

Fig. 2 is a vertical section of the bag shown in Fig. 1;

Fig. 3 shows a modified form of bag and base therefor;

Fig. 4 shows another modified form of bag;

Fig. 5 shows the bag in Fig. 4 collapsed or folded for storing or shipping;

Fig. 6 is a cross section of the bag on the line 6—6 of Fig. 4; and

Fig. 7 is a longitudinal section on the line 7—7 of Fig. 5.

Candy bags or containers constructed of regenerated cellulose sheeting for protecting the candy against dust and moisture and for displaying the candy are well-known. It has been found that regenerated cellulose sheeting which is strong enough for this purpose contains glycerine which causes the candy to stick to the regenerated cellulose sheeting due to moisture given off from the candy. A candy stick-proof regenerated cellulose sheeting has been developed but this regenerated cellulose sheeting is relatively weak, and is not adapted for purposes of this sort unless it is protected against crushing and breaking by a separate cover provided for this purpose.

In the embodiments disclosed in Figs. 1, 2 and 3, the bag comprises an inner wall 10 of stick-proof regenerated cellulose sheeting which may be made relatively thin as it is protected by an outside wall or cover 11 which may be made of relatively strong and stiff tarlatan of any suitable desired color to make the package attractive and of any suitable desired size mesh. This combination of inner and outer walls produces a bag which is waterproof, stick-proof, and which is relatively stiff and strong. The inner and outer walls 10 and 11 may be formed as seamless tubes or may be formed out of strips of material folded or rolled so as to produce tubes, the abutting or overlapping edges of which may be secured together in any well-known manner.

For the purpose of giving strength to the bag so as to support it in upright position a base 12, Fig. 2, may be provided. This base is in the form of a disk for bags of the shape shown in Fig. 1 and is preferably provided with a central hole 13 into which the ends of the tubes comprising the inner and outer walls 10 and 11 are tucked and held frictionally.

After candy has been placed in the bag in any suitable manner the upper portion of the bag may be tied with a ribbon 14 of any desired color. The ribbon securely seals this end of the bag. The outer wall 11 protects the inner wall 10 against rupture at this point and is of sufficient strength to be drawn tightly around the candy which also assists in supporting the bag in upright position with respect to its base. The inner wall of regenerated cellulose sheeting may be relatively loose to place the strain entirely on the outer wall or covering of tarlatan.

In the construction shown in Fig. 3 the container or bag is of rectangular cross section. It is clear, of course, that the bag may be made of any cross section appealing to the buyer or appropriate to the shape of the candy, and likewise the strands or meshes and openings in the outer wall may be of any suitable design and arrangement. In this construction the base comprises an inner member 15 of any relatively stiff material which in this instance may be imperforate. The base also includes an outside member 16 which may be provided with an upstanding flange 17. The construction of the bases 15 and 16 may be such that the ends of the inner and outer walls may be clamped between them and the base 16 may be held in position by frictional contact. If desired, these parts may be secured together by an adhesive or any other suitable means.

In the construction shown in Figs. 4, 5, 6 and 7, the inner wall 10a of the bag may be made of a sheet of regenerated cellulose sheeting with freely overlapping edges 20 and 21, as indicated in Fig. 6. The outer wall 11a may be made of a sheet of tarlatan with adjacent or overlapping edges 22 and 23, Figs. 6 and 7, which may be secured together in overlapping relation by inner and outer strips 24 and 25, of paper or the like, preferably secured to the inner and outer edges 22 and 23 and to each other by any suitable adhesive and in any suitable manner.

After the inner and outer walls have been assembled, the lower ends of the sides opposite to the paper strips 24 and 25 are folded inwardly toward the paper strips after which the portions between the folded side and the paper strips are folded toward each other upon the first folded-in portion, after which the lower ends of the paper strips are folded in upon the folded-in portions. An adhesive is preferably applied to the lower end of the inner side of the inner strip of paper 24 before it is folded inwardly. This constitutes the base of the bag which as shown in Fig. 7 may be folded against the main body of the bag and held there while the adhesive is drying and also for facilitating packing for shipment or storage.

It is obvious that during manufacture the inner and outer walls may be made in long sections either separately and later assembled, or may be assembled automatically as they are formed into a tube, and that in either case the paper strips may be applied during this operation. Any suitable lengths may be cut off from long sections and formed into bags, as described. The strips of paper may be relatively stiff to add rigidity to the bag when filled and to facilitate handling and filling.

As shown in Fig. 4, the upper end of the bag may be closed by a ribbon as in the first embodiment described.

Any suitable advertising matter, trade name, etc. may be impressed on the outer strip 25 as shown in Fig. 5.

While the invention has been described with particularity as to several embodiments of the invention it is to be understood, of course, that the principles of this invention might be carried out by other embodiments, and that the terms used in the claim are words of description and not of limitation.

What I claim is:

A container comprising an inner tubular wall of flexible transparent material, an outer tubular wall of substantially inextensible strong stiff open mesh fabric, and means for bringing corresponding ends of the tubular members into contact for securing them together to constitute the closed end of the container, said tubular walls being separately formed and free from each other except at said base whereby the other corresponding ends of said tubular walls may be drawn tightly around the contents of the container without placing any strain on the inner tubular member.

RAY W. KROUT.